US008815406B2

(12) United States Patent
Fujii et al.

(10) Patent No.: US 8,815,406 B2
(45) Date of Patent: Aug. 26, 2014

(54) DISPLAY PANEL EQUIPPED WITH FRONT PLATE, DISPLAY DEVICE, AND RESIN COMPOSITION

(75) Inventors: Akiyoshi Fujii, Osaka (JP); Tokio Taguchi, Osaka (JP); Chiaki Minari, Osaka (JP); Takashi Yoshizawa, Osaka (JP); Katsuhisa Senda, Osaka (JP); Mitsutoshi Naito, Osaka (JP); Eishi Katakami, Kisaradu (JP); Tsubasa Shiine, Kisaradu (JP)

(73) Assignees: Sharp Kabushiki Kaisha, Osaka-shi (JP); Kyoritsu Chemical Co., Ltd., Tokyo (JP)

( * ) Notice: Subject to any disclaimer, the term of this patent is extended or adjusted under 35 U.S.C. 154(b) by 7 days.

(21) Appl. No.: 13/805,866

(22) PCT Filed: Jun. 14, 2011

(86) PCT No.: PCT/JP2011/063570
§ 371 (c)(1),
(2), (4) Date: Dec. 20, 2012

(87) PCT Pub. No.: WO2011/162125
PCT Pub. Date: Dec. 29, 2011

(65) Prior Publication Data
US 2013/0095339 A1 Apr. 18, 2013

(30) Foreign Application Priority Data
Jun. 21, 2010 (JP) ................ 2010-140409

(51) Int. Cl.
B32B 27/32 (2006.01)
G02B 27/00 (2006.01)
G02B 1/04 (2006.01)
G02F 1/1333 (2006.01)

(52) U.S. Cl.
CPC ...... *G02B 27/0006* (2013.01); *G02F 1/133308* (2013.01); *C08J 2323/06* (2013.01); *G02F 2202/28* (2013.01); *G02B 1/04* (2013.01); *G02F 2001/133331* (2013.01)
USPC ....................................... 428/523

(58) Field of Classification Search
None
See application file for complete search history.

(56) References Cited

U.S. PATENT DOCUMENTS

| | | | |
|---|---|---|---|
| 6,204,896 B1 | 3/2001 | Matsuhira et al. | |
| 8,545,708 B2 * | 10/2013 | Fujii et al. | 216/11 |
| 2006/0062938 A1 * | 3/2006 | Takeko et al. | 428/1.55 |
| 2007/0046873 A1 * | 3/2007 | Sakurai et al. | 349/122 |
| 2009/0011373 A1 * | 1/2009 | Gonin et al. | 430/323 |
| 2009/0186552 A1 | 7/2009 | Shinya et al. | |
| 2009/0296033 A1 | 12/2009 | Shinya et al. | |
| 2010/0003425 A1 | 1/2010 | Kamata et al. | |
| 2010/0033661 A1 | 2/2010 | Shinya et al. | |
| 2010/0043965 A1 | 2/2010 | Kamiya et al. | |
| 2010/0097552 A1 | 4/2010 | Shinya et al. | |
| 2010/0097746 A1 | 4/2010 | Toyoda et al. | |
| 2010/0098839 A1 | 4/2010 | Toyoda et al. | |
| 2010/0118245 A1 | 5/2010 | Toyoda et al. | |
| 2010/0134713 A1 | 6/2010 | Toyoda et al. | |
| 2010/0178834 A1 | 7/2010 | Toyoda et al. | |
| 2010/0210166 A1 | 8/2010 | Toyoda et al. | |
| 2010/0215976 A1 | 8/2010 | Suwa et al. | |
| 2012/0118483 A1 | 5/2012 | Toyoda et al. | |

FOREIGN PATENT DOCUMENTS

| | | |
|---|---|---|
| JP | 3220403 | 10/2001 |
| JP | 2005-55641 | 3/2005 |
| JP | 2006-113574 | 4/2006 |
| JP | 3842347 | 11/2006 |
| JP | 2007-94191 | 4/2007 |
| JP | 2007-94366 | 4/2007 |
| JP | 2008-129159 | 6/2008 |
| JP | 2008-282000 | 11/2008 |
| JP | 2009-104002 | 5/2009 |
| JP | 2009-271489 | 11/2009 |
| JP | 2009-294360 | 12/2009 |

OTHER PUBLICATIONS

Search Report mailed Aug. 16, 2011, directed to International Application No. PCT/JP2011/063570; 4 pages.

* cited by examiner

*Primary Examiner* — Sheeba Ahmed
(74) *Attorney, Agent, or Firm* — Morrison & Foerster LLP

(57) ABSTRACT

The present invention provides a display panel equipped with a front plate and a display device, in each of which streak unevenness is sufficiently resolved in the periphery of a display area. The display panel equipped with a front plate of the present invention comprises: a display panel; a front plate; and a cured resin composition layer disposed between the display panel and the front plate, wherein the cured resin composition layer has a loss tangent of 2 or less at 0 to 70° C.

7 Claims, 11 Drawing Sheets

DISPLAY PANEL EQUIPPED WITH FRONT PLATE, DISPLAY DEVICE, AND RESIN COMPOSITION

REFERENCE TO RELATED APPLICATIONS

This application is the national stage under 35 USC 371 of International Application No. PCT/JP2011/063570, filed Jun. 14, 2011, which claims priority from Japanese Patent Application No. 2010-140409, filed Jun. 21, 2010, the entire contents of which are incorporated herein by reference.

FIELD OF THE INVENTION

The present invention relates to a display panel equipped with a front plate, a display device, and a resin composition. More specifically, the present invention relates to a display panel equipped with a front plate in which a glass or plastic plate is provided in front of a display screen in view of protection of a display surface, prevention of cracking of a large display, and design, and a touch panel is further provided in view of interactivity, and also relates to a display device and a resin composition.

BACKGROUND OF THE INVENTION

Displays (display devices) including a display panel such as a liquid crystal panel are indispensable in various applications such as business applications and common household use. Various displays including small displays such as mobile phones, game machines, and the like and large displays such as TVs, outdoor information displays, and the like have been proposed and put to practical use.

In such displays, not only display performance, but also interactivity is highly appreciated in recent years. Based on such a trend, a touch panel is provided in front of a display screen in some displays. Further, since a liquid crystal panel includes a thin glass substrate, a glass or transparent plastic plate is provided in front of a display screen in some displays depending on applications thereof, in view of protection of a display surface and prevention of cracking of a large display. In some cases, since a hard and flat surface with a gloss is desired in view of design, a glass plate is provided in front of a display screen.

The plate such as a glass plate, a plastic plate, and a touch panel (hereinafter, referred to as a front panel) to be provided in front of a display screen is commonly disposed in front of a display surface, namely disposed in front of a surface with a polarizer attached thereto, with a space therebetween. Such disposition with a space however leads to surface reflection caused by an interface of refractive index among a display-side (inside) face of a front panel, surfaces of a polarizer, and air. Such surface reflection problematically causes phenomena of double images and image reflection which disturb displayed images. Such phenomena are caused by, as mentioned above, a refractive index difference between air and the material of a front panel. Accordingly, problems of such phenomena can be solved by providing an antireflection coating on each surface or replacing an air layer with a material having a refractive index closer to the refractive index of equipment such as a front panel and a polarizer. For example, a case where a space formed by a front panel in a liquid crystal panel is filled with a resin is disclosed (see Patent Literature 1 and the like). A case where a space formed by a front panel in a plasma panel is bonded by a resin is also disclosed (see Patent Literature 2 and the like).

A conventional display panel equipped with a front plate is disclosed in which the elastic modulus of a resin after curing is set to a predetermined value or less to overcome unevenness occurring on displayed images due to stress derived from shrinkage generated on curing of the resin that bonds a front plate (see Patent Literature 3). A liquid crystal panel equipped with a front plate is disclosed in which a guide is formed to serve as a dam around a resin to be injected between a front plate and a liquid crystal panel, and the dam is filled with a photocurable resin so that the front panel is attached to the liquid crystal panel (see Patent Literature 4). A display device is also disclosed which includes a liquid crystal display element in which liquid crystals are held between a counter substrate and a transparent substrate, an optical film provided on the transparent substrate of the liquid crystal display elements and having smaller outside dimensions than the transparent substrate, and a transparent plate bonded to the optical film and the surface of the transparent substrate around the optical film with a photocurable transparent adhesive (see Patent Literature 5). Also disclosed is a method for producing a display device including a liquid crystal display element in which liquid crystals are enclosed between a counter substrate and a transparent substrate, and a transparent touch switch, the method having the steps of applying a transparent adhesive to the transparent touch switch or the display surface of the liquid crystal display element and the like (see Patent Literature 6).

With regard to an adhesive resin, an optical stack including an antireflection film, a polarizing film, an adhesive layer, a glass cell for liquid crystal display, an adhesive layer, and a polarizing film sequentially stacked is disclosed, in which maximum values A and B of the loss tangent (tan δ) of the two adhesive layers has a ratio (B/A) of 1.1 or more (see Patent Literature 7). The maximum value of the loss tangent herein refers to, in measurement of a dynamic storage elastic modulus (E') and dynamic loss elastic modulus (E'') by heating the corresponding adhesive layer in a temperature range of −70 to 200° C. at a rate of temperature rise of 4° C./min and at a frequency of 1 Hz, the maximum value of E''/E' (=tan δ) within the above temperature range.

Also disclosed is an optical resin composition containing (A) acrylic acid derivative polymers, (B) acrylic acid derivatives and (C) a crosslinking agent, and having an adhesive force after curing of 3N/25 mm or more at 60° C., and tan δ of 0.40 or more at 60° C. (see Patent Literature 8).

Patent Literature 1: JP-A 2005-55641
Patent Literature 2: JP-A 2007-94191
Patent Literature 3: JP-A 2008-282000
Patent Literature 4: JP-A 2008-129159
Patent Literature 5: Japanese Patent No. 3842347
Patent Literature 6: Japanese Patent No. 3220403
Patent Literature 7: JP-A 2006-113574
Patent Literature 8: JP-A 2009-294360

SUMMARY OF THE INVENTION

In a display panel equipped with a front plate, for example, in a case where a front plate is attached to a large display by using an ultraviolet curing resin (UV-curable resin), shrinkage is problematically generated during curing. As disclosed in Patent Literature 3 mentioned above, shrinkage on curing gives stress to cause deformation of a liquid crystal display, resulting in display unevenness. Accordingly, reduction in elastic modulus is one means to avoid shrinkage on curing. For example, UV-curable resins commonly having a shrinkage of 4 to 5% are allowed to have a reduced elastic modulus in a greatly softened state to be viscous even after curing or in a gel state in some cases.

Studies of the present inventors however clarified that unevenness generated in a display surface include not only unevenness randomly generated in the plane but also unevenness in streaks (peripheral streaks) generated along the periphery of a display screen. The unevenness randomly generated in the plane can be comparatively easily treated because it can be resolved by avoidance of application unevenness leading to uniformization of stress distribution, reduction in the elastic modulus, or reduction in shrinkage on curing. In contrast, peripheral streaks (hereinafter, also referred to as peripheral unevenness, streak unevenness around the display area, and the like) were found to be not easily resolved simply by reduction in the elastic modulus.

Peripheral streaks presumably occur by the following mechanism. At the time of application, since the resin is a liquid to have a good following capability, no warp is caused (cross-sectional view in FIG. 14). Next, ultraviolet cure (UV curing) is performed. The resin is shrunk on curing by UV light. Such shrinkage on curing presumably makes a panel drawn towards the center. At this time, if a front plate glass is thicker than a liquid crystal panel to be presumably harder than the liquid crystal panel, the liquid crystal panel is relatively greatly subjected to the stress to be deformed. In such a case, the panel is warped to be concaved on the resin side. A liquid crystal panel commonly includes two glass substrates (a TFT-side glass and a color filter-side glass), and a size difference is generated between two glass substrates due to distortion thereof. In the liquid crystal panel, the glass substrates are bonded by a sealing resin in the vicinity of the end faces to be fixed to each other. In such a case, the size difference is resolved by ruffling deformation around the end faces of the substrate on the CF side which is positioned closer to the front plate. This deformation presumably changes the thickness of the liquid crystal cell to cause peripheral streaks (peripheral unevenness portion 31) (FIG. 15). A portion having a large cell thickness is a white unevenness portion 31$a$ and a portion having a small cell thickness is a black unevenness portion 31$b$.

Peripheral streaks may be observed, even in a case where peripheral streaks are not observed right after UV curing at normal temperature, when the display panel is once heated (to a temperature close to the upper limit of an operating temperature range, e.g. 50 to 60° C., or 70° C. in some cases) and then cooled down to a normal temperature. Accordingly, a heat history left by the use of a display panel (after a reliability test) also problematically causes peripheral streaks. The mechanism of this phenomenon is presumably as mentioned below. Heating to high temperatures reduces the elastic modulus of a resin to release the stress, so that peripheral streaks are going to be resolved. While the temperature falls to a normal temperature, however, the elastic modulus of the resin is again increased and the resin expanded at a high temperature shrinks to gather, generating another stress (FIG. 16 [at high temperatures], FIG. 17 [after cooling]). Namely, at a high temperature, the resin that bonds the front plate is very soft to be almost in a gel state and is itself expanded. Accordingly, distortion of the substrates is easily recovered, so that shrinkage on curing and the stress due to distortion of the panel caused along the shrinkage are going to be resolved. The distortion is therefore reduced and the peripheral streaks are nominally resolved or faded. However, on cooling, the elastic modulus of the resin is recovered along with the shrinkage of the resin. Along with the shrinkage, the panel is subjected to the stress in the same direction as that of the shrinkage on curing to have a distortion, resulting in streak unevenness. It is also presumable that peripheral streaks may be more easily observed than in a case after UV curing. The reason for this is that the state of the peripheral streaks is changed as the state is different from the state under the same stress relation in the case of UV curing at normal temperature.

From this viewpoint, it is easily presumable that use of a heat curing resin cannot solve the problem of peripheral streaks. The reason for this is that heat curing is started without stress at a high temperature at which the heat curing reaction is promoted, resulting in generation of shrinkage stress in polymerization associated with the curing reaction and stress caused by difference in coefficient of thermal expansion while the temperature falls after the reaction.

Accordingly, the shrinkage stress on curing of a resin changes the cell thickness in the periphery near end portions to locally change conditions such as a relation between the voltage and transmittance in a cell, so that peripheral streaks are observed. In addition, the present inventors found another problem that the peripheral streaks may become obvious through a high-temperature heat history.

For example, in a display device having the cross-sectional structure illustrated in FIG. 14, after attachment of a panel to a glass plate and a curing reaction, streak unevenness is observed in the periphery of the display area during operation of the display. Specifically, white and black streaks are generated at end portions of the panel. In FIG. 18, streak unevenness occurs in the periphery of the display area (the area in a range of 5 to 10 mm from the end, a portion indicated by a bracket).

Conventionally, streak unevenness in the periphery of the display area has not been mentioned in any of the above Patent Literatures. Accordingly, improvement in display quality in consideration of the above viewpoint has not been studied. For example, Patent Literature 7 discloses improvement in an acrylic resin material that is used as an adhesive resin (adhesive, glue) for a polarizer of a liquid crystal panel, to overcome display failures caused by stress. Configuration requirements in Patent Literature 7 are tan δ of 0.85<tan δ<1.46 on the display surface side and 1.3<tan δ<1.85 on the back side. In examples of Patent Literature 7, only resins having a quite small elastic modulus are disclosed. The problem mentioned in Patent Literature 7 is not solved before an area where shrinkage is a problem and an area where the elastic modulus is a problem are separately treated. However, in Patent Literature 7, polarizer adhesive layers on both sides of the panel, namely, resin layers between the panel substrate and the polarizing films (polarizers) are focused. Accordingly, nothing about the resin used between the panel and the front plate is mentioned and peripheral unevenness is not at all indicated. In addition, no technical meaning is disclosed with regard to determination of the range of tan δ In other words, the reason for such determination is not logically mentioned, and relation with the peripheral unevenness is not at all recognized.

Patent Literature 8 discloses an optical resin composition having a shock absorption required for protection of an image display device and an adhesion force excellent in moisture proof reliability. In the description, peripheral unevenness is not at all indicated. In examples, since a transparent sheet is attached to a liquid crystal panel, failures caused by shrinkage on curing in formation of a cured product layer from a resin composition are not a problem.

The present invention has been devised in consideration of the state of the art and aims to provide a display panel equipped with a front plate and a display device, in each of which peripheral streaks in a display panel equipped with a front plate are sufficiently resolved and the peripheral streaks are suppressed even after use thereof which leaves a high-temperature heat history, so that the display quality is improved.

The present inventors have intensively studied about a display panel equipped with a front plate in which a cured resin composition layer, instead of a space, is formed between the front plate and the display panel, and a display device including the same to find out another problem. Namely, as mentioned above, in addition to conventional display unevenness along with shrinkage on curing of a resin composition, problems of peripheral unevenness and another peripheral unevenness after a heat history (after a reliability test) left through the use of the display panel were found. The cause of these problems is presumably that the periphery of the display panel has a state different from the center part of the display panel. The present inventors noticed that such peripheral unevenness relates to properties of the resin composition between the front plate and the display panel, such as curing characteristics and internal stress as a cured product. The present inventors have found out that the following solution of the problems. Namely, in a cured product, in the process of heating and cooling within an operating temperature range, the cured resin is not allowed to easily alternate between a liquid phase and a solid phase. For that purpose, the storage elastic modulus and the loss elastic modulus after curing are set to have a ratio "tan δ (loss tangent)" of a specific value or less. Accordingly, the present invention was completed. For example, the phenomenon that a high-temperature heat history makes the unevenness obvious is presumably caused by the following mechanism. At a high temperature, the elastic modulus is lowered so that the resin is displaced and deformed towards the dynamic equilibrium point in accordance with the internal stress, resulting in stress relaxation. The stress relaxation comparatively slowly proceeds. When the temperature falls from high temperatures to low temperatures, the elastic modulus is recovered and the equilibrium point is also changed. At this time, it would be fine if the resin is displaced and deformed in the same manner as it does at high temperature. In reality, however, the elastic modulus of the resin is already recovered to make the resin hardly move. Accordingly, the resin is fixed while containing stress again.

The present inventors also found out that a relation between the constitution of the resin composition and the glass transition temperature (Tg) is important for setting the tan δ within the above range.

Namely, the present invention is a display panel equipped with a front plate comprising: a front plate; and a cured resin composition layer disposed between the display panel and the front plate, wherein the cured resin composition layer has a loss tangent of 2 or less at 0 to 70° C.

In the display panel equipped with a front plate of the present invention, the cured resin composition layer has a loss tangent of 2 or less at 0 to 70° C. The loss tangent (tan δ) is a ratio of a loss elastic modulus to a storage elastic modulus of the cured resin composition and is obtainable by using a formula "(loss elastic modulus)/(storage elastic modulus)". The temperature range of 0 to 70° C. is the operating temperature range of the display panel. Preferably, the loss tangent is 0.2 or more. In a preferable embodiment, the resin is adjusted so that the storage elastic modulus after curing is reduced and the ratio between the storage elastic modulus and the loss elastic modulus is 0.2 to 2 in the operating temperature range. In such adjustment, the shearing property of the resin is enhanced so that the resin is easily movable along with internal stress, and resin molecules are set not to have a phase transition such as liquidation (phase transition makes the ratio abnormally great).

The resin having tan δ of not more than 2.0 in the operating temperature range hardly has a phase change or physical property change like a phase change in the operating temperature range.

This adjustment sufficiently suppresses a divergence tendency of a cured product. For example, even at a high temperature (normally around 60° C.) in the operating temperature range, a drastic change such as a phase transition is not caused. The resin is moderately converted to a rubbery state to have a better following capability. As a result, an internal stress tends to be released and crosslinks among molecules are kept so that the molecular framework that crosslinks the resin is left. Accordingly, large stress associated with the temperature fall does not generate, so that the streak unevenness generated in the periphery of the display area within the operating temperature range is sufficiently suppressed. As a result, the reliability is significantly enhanced.

The lower limit of the tan δ is preferably 0 or larger, and more preferably 0.2 or larger. Such tan δ allows a cured product to be sufficiently elastically soft.

In the cured resin composition layer having such tan δ, the tan δ may or may not have a maximum value in the operating temperature range (0 to 70° C.).

The cured resin composition layer is preferably formed from a resin composition containing a monomer component. The cured resin composition layer fills a space between a front plate and a display panel, and bond the front plate to the display panel. The resin composition forming the cured resin composition layer preferably contains monomers and oligomers. The resin composition containing a plasticizer is preferable.

The monomers may be one or plural kinds of (meth)acrylate monomers as shown in Table 1 described later. The monomers used are preferably of at least one kind selected from the group consisting of aliphatic (meth)acrylates, glycol (meth)acrylates, (meth)acrylates having a hydroxyl group, and alicyclic (meth)acrylates.

The oligomers may be multimers (dimers or higher multimers) of one or plural kinds of monomer units, and are commonly used as oligomers together with monomer(s) in an optical resin composition. An exemplary oligomer has a weight average molecular weight of 500 to 100000.

The resin composition may contain a crosslinking agent that is a compound having at least two (meth) acryloyl groups as a monomer component in the molecule. Additionally, the resin composition may contain polymers other than the oligomers and the monomers.

For curing of the resin composition, photopolymerization by ultraviolet irradiation is preferably employed. Also, heat polymerization, another photopolymerization, electron beam polymerization, and the like may be employed. Commonly, a polymerization initiator is used. For example, in photopolymerization by ultraviolet irradiation, usable as a photopolymerization initiator are benzophenone compounds, anthraquinone compounds, benzoin compounds, sulfonium salts, diazonium salts, onium salts, and the like. As a heat polymerization initiator, organic peroxides, azo compounds, or the like may be used. Each of these may be used alone or two or more of these may be used in combination. The amount of the polymerization initiator added is preferably 0.01 to 10% by mass, more preferably 0.1 to 7% by mass, and still more preferably 1 to 5% by mass in the resin composition (100% by mass).

As mentioned above, the present inventors found out the importance of a relation between the components of the resin composition and the glass transition temperature (Tg) for achieving the above range of the tan δ. A preferable embodiment is mentioned below.

Namely, the cured resin composition layer is formed from a resin composition containing a monomer component in an embodiment (1) in which the monomer component is comprised of monomers not having a glass transition temperature within 20 to 80° C., specifically, in which the monomer component is comprised of monomers having a glass transition temperature of 20° C. or lower and/or monomers having a glass transition temperature of 80° C. or higher, or an embodiment (2) in which the monomer component is comprised of monomers having a glass transition temperature of 20 to 80° C. and monomers having a glass transition temperature of 80° C. or higher, and the amount of the monomers having a glass transition temperature of 80° C. or higher is 3% by mass or more in the resin composition (100% by mass). The glass transition temperature of monomers refers to a glass transition temperature in a state of homopolymers.

For description of these preferable embodiments, first, the following will discuss polymer blend and compatibility. The following state of polymer blend schematically shows the state of the cured resin composition and is a presumed state for explanation of the resin composition for achieving the range of the tan δ.

FIG. 19 is a graph showing a storage elastic modulus relative to the temperature in a completely compatible cured resin composition and an incompatible cured resin composition. FIGS. 20 and 21 are schematic views each illustrating a cured resin composition in an incompatible state (having a sea-island structure). FIG. 22 is a schematic view illustrating a cured resin composition 123 in a compatible state.

Commonly, in a case where two kinds of polymers (hereinafter, referred to as a polymer A and a polymer B) are in an incompatible state (FIGS. 20 and 21), a transition point of the polymer A and a transition point of the polymer B are generated. In a case where the polymer A and the polymer B are in a compatible state (FIG. 22), only a transition point derived from the glass transition temperature is present in a graph showing the storage elastic modulus relative to the temperature in a cured resin composition.

A UV-curable resin is commonly an aggregation of random copolymers. In such random copolymers, polymer groups of various temperature characteristics are present in a sea-island structure. Namely, the UV-curable resin is of a type in which a transition point of the polymer A and a transition point of the polymer B are generated.

The resin used in the present invention is commonly a resin (UV-curable resin) of a type in which a transition point of the polymer A and a transition point of the polymer B are generated. In such a resin, control of island polymers 121, namely, control of a transition temperature/island polymer ratio of the island polymers 121, allows control of the tan δ so that the above range of the tan δ is achieved.

In a preferable embodiment, the cured resin composition layer is formed from a resin composition containing a monomer component, and the monomer component is comprised of monomers not having a glass transition temperature within 20 to 80° C. The monomers not having a glass transition temperature within 20 to 80° C. specifically refers to monomers having a glass transition temperature of 20° C. or lower and/or monomers having a glass transition temperature of 80° C. or higher. In a more preferable embodiment, the resin composition contains an oligomer component and a monomer component and the monomer component is constituted as described above. Commonly used oligomers have a glass transition temperature of lower than 40° C.

In a case where monomers having a glass transition temperature of 20° C. or lower are used, a transition point is generated to overlap with the transition point (transition point first generated from a low-temperature side) of sea polymers 122. In a case where monomers having a glass transition temperature of 80° C. or higher are used, a transition point other than the transition point of the sea polymers 122 is generated at a temperature of 80° C. or higher. In either embodiment or in an embodiment in which both embodiments are combined, it is possible to avoid generation of a transition point within 20 to 80° C.

In a preferable embodiment, the cured resin composition layer is formed from a resin composition containing a monomer component, the monomer component includes monomers having a glass transition temperature of 20 to 80° C. and monomers having a glass transition temperature of 80° C. or higher, and the amount of the monomer having a glass transition temperature of 80° C. or higher is 3% by mass or more in the resin composition (100% by mass). More preferably, the resin composition contains an oligomer component and a monomer component, and the monomer component is constituted as described above. Also in such an embodiment, a transition point can be shifted to a higher temperature side compared to the case where only monomers having a glass transition temperature of 20 to 80° C. are used. Then, a transition point is generated at a temperature different from the transition point of the sea polymers 122 and at 80° C. or higher. Namely, generation of a transition point within 20 to 80° C. is avoided, so that the value of the loss tangent in the present invention is obtained.

In a preferable embodiment of the present invention, shrinkage on curing of the resin composition is reduced so that initial stress of shrinkage on curing is reduced. Namely, in the present invention, the cured resin composition layer preferably has a volume shrinkage (also referred to as shrinkage on curing) of 4.5% or less when the resin composition is cured. In the resin composition in a liquid state of the present invention, the curing reaction in which the resin composition is cured commonly proceeds at around room temperature. Therefore, the temperature hardly contributes to the reaction and the shrinkage on curing of the resin presumably, causes generation of stress. Reduction in the shrinkage on curing, namely, setting the upper limit value of the shrinkage on curing as mentioned above allows reduction in the initial stress of shrinkage on curing, suppressing streak unevenness in the periphery of the display area after shrinkage on curing of the resin composition. In particular, the upper limit value is preferably 3.7% or less. A preferable lower limit value is 3.3% or more.

In the cured resin composition layer, the product of the volume shrinkage (%) when the resin composition of the cured resin composition layer is cured and the storage elastic modulus (MPa) in the cured resin composition layer (also referred to as shrinkage*elastic modulus in the present description) is preferably 0.16 or less at 60° C. The product is more preferably 0.1 or less. The product preferably has a lower limit value of 0.005 or more. Such a configuration, synergistically with the reduction in the shrinkage on curing, suppresses deformation so as to further efficiently suppress generation of peripheral streaks.

The resin composition preferably has a small storage elastic modulus over a wide temperature range, namely, a totally small storage elastic modulus. For example, the storage elastic modulus is preferably 0.03 MPa or less at 60 to 100° C. The storage elastic modulus is more preferably 0.02 MPa or less and still more preferably 0.01 MPa or less.

In the resin composition, shrinkage on curing from a liquid state presumably contributes to generation of stress. The elastic modulus presumably significantly contributes to movement in the operating temperature range after curing.

The product of the elastic modulus and the shrinkage is a value to be used as an indication of deformation. The cured resin composition layer preferably satisfies the formula "log $y < -6.6 \times 10^{-3} x + 0.53$" in which "y" indicates the product of the volume shrinkage (%) when the resin composition is cured and the storage elastic modulus (MPa) at a temperature "x" (° C.).

The formula can be calculated by using the equation $$\sigma = -E(1-2\nu) \cdot (-V/3)".$$

In the equation, "σ" indicates stress of shrinkage on curing, "ν" indicates a Poisson's ratio (about 0.4 to 0.5 in the case of an adhesive), "E" indicates the elastic modulus (storage elastic modulus), and "V" indicates shrinkage on curing (volume shrinkage when the resin composition is cured).

The lower limit of the "x" satisfying the above equation is, for example, 10 or more, and preferably 25 or more. The upper limit of the "x" is, for example, 80 or less, and preferably 60 or less.

In the present invention, the storage elastic modulus and the loss elastic modulus are preferably measured under the following conditions.

The storage elastic modulus and the loss elastic modulus are measured by pulling a test sample in a size of 50×10×4 mm using a dynamic viscoelasticity analyzer (Seiko Instruments Inc., DMS-6100) at a temperature of −100 to 100° C. (rate of temperature rise of 2° C./min) and at a frequency of 1 Hz in a tension mode.

The tan δ is calculated from a ratio of the measured storage elastic modulus and the loss elastic modulus.

The nonreactive component may be a plasticizer commonly used in the technical field of the present invention. Examples of the plasticizer are mentioned below.

Exemplified are polymers, oligomers, ester phthalates, and castor oil which are compatible with the nonreactive component. Examples of the oligomers or polymers include polyisoprene, polybutadiene, and xylene oligomers or polymers. These softening components are commercially available under the trade names of LIR series from KURARAY CO., LTD. and polyoil series from Degussa. Each of these softening components may be used alone or two or more kinds of these may be used in combination.

The nonreactive component preferably has a phase transformation temperature and a phase change temperature which are higher than the phase transformation temperature and the phase change temperature of the framework component (oligomers and monomer component). This prevents streak unevenness caused by the phase transformation and phase change of the nonreactive component.

The ratio of the framework component and the nonreactive component is preferably 30:70 to 70:30, and more preferably 40:60 to 60:40 in mass.

The cured resin composition layer in the present invention may be formed between a front plate and a display panel. Commonly, a resin composition is applied or injected to bond a front plate to a display panel, and the resin composition is cured to form a cured resin composition layer. In the present invention, such a cured resin composition layer is favorably applied to an embodiment in which a resin composition is applied to a front plate and/or a display panel, or injected into a space between the front plate and the display panel, and then cured.

Alternatively, a cured resin composition layer may be formed by sandwiching a sheet of a cured resin composition (also referred to as a sheet-shaped resin or adhesive sheet) between a front plate and a display panel.

In the case of application or injection of the resin composition, commonly, the resin composition is first applied to one or both of bonding faces of the front plate and the display panel. Next, the front plate and the display surface are bonded to each other by the resin composition. The resin composition is then cured by UV light. In the case of using an adhesive sheet, a sheet-shaped resin sandwiched between transparent films is used. For example, the sheet-shaped resin is first attached to the front plate, and then the display surface is bonded to the sheet-shaped resin on the front plate.

In comparison of the case where the resin composition is applied or injected (UV curing type) and the case where an adhesive in a sheet shape is used, since the adhesive in a sheet shape contains a resin after crosslinking (curing), shrinkage due to curing does not occur. In contrast, shrinkage occurs in a crosslinking reaction in the case of the UV curing type. Accordingly, in the case of the UV curing type, stress generated due to shrinkage on curing deforms a display panel of a liquid crystal display and the like, leading to display unevenness. In contrast, in the case of an adhesive in a sheet shape, since the adhesive is sandwiched by films, an additional process for making the adhesive in such a shape is required. In addition, these films are to be disposed during the production process, so that such an adhesive is more expensive than the simple resin. Moreover, since a measure against bubbles left in the adhesive during the process is hardly set in the case of an adhesive in a sheet shape, a decompression chamber for degassing may be needed in some cases, resulting in big equipment. Recently, models of a TV display with a front plate bonded thereto have been proposed in view of designs as mentioned above. In the case of large liquid crystal displays for TVs, a UV curable resin is preferably used for bonding in view of cost and equipment.

In the case of bonding a front plate to a large display using a UV-curable resin, suppression of shrinkage during the curing process is a target to be achieved. In the case of a heat-curable resin, since a high temperature at which curing starts is a point where no stress is generated, stress is generated while the temperature falls after curing. Peripheral streaks are therefore hardly overcome in the case of using a heat-curable resin. In the present invention, such peripheral unevenness due to shrinkage on curing is suppressed and streak unevenness after a high-temperature heat history is efficiently suppressed. Accordingly, such a resin is favorably used in the case of the UV curing type.

The front plate in the display panel is a glass, plastic, and the like sheet provided on the front face of the display screen in view of protection of the display surface, prevention of cracking of a large display, and designs. Further, the front plate is equipped with a touch panel in view of interactivity. Accordingly, the front panel includes a glass or plastic sheet, a touch panel, and the like.

The front plate in the large display for TVs has a thickness of commonly 1 mm or more, and preferably 2.5 to 3.0 mm. In the case where the display panel is a liquid crystal display panel, transparent substrates (glass substrate and the like) used as a pair of substrates in the liquid crystal display panel each commonly have a thickness of 0.4 to 1.0 mm.

Another aspect of the present invention is a display device including the display panel equipped with a front plate of the present invention.

A preferable embodiment of the display device of the present invention is similar to the preferable embodiment of the display panel equipped with a front plate of the present invention. Examples of such a display device include liquid crystal display devices, EL (Electroluminescence) display devices, and plasma displays. The display device is applicable to small displays such as mobile phones and game machines and large displays such as TVs and outdoor information displays. Also, the display device is favorable as a display device typically equipped with a touch panel. In terms of sufficiently reducing a creeping property, a mechanism for supporting the panel is preferably provided on the side facing a chassis (opposite to the side facing the display surface side). Other components are not particularly limited.

Still another aspect of the present invention is a resin composition used for forming the cured resin composition layer in the display panel equipped with a front plate of the present invention.

A preferable embodiment of the resin composition of the present invention is similar to the preferable embodiment of the resin composition in the display panel equipped with a front plate of the present invention. Other components are not particularly limited, provided that the effect of the present invention is exerted.

The aforementioned modes of the embodiments may be employed in appropriate combination as long as the combination is not beyond the spirit of the present invention.

In the display panel equipped with a front plate and the display device of the present invention, streak unevenness in the periphery of the display area is sufficiently resolved.

DETAILED DESCRIPTION OF THE INVENTION

The following will discuss the present invention in more detail based on examples with reference to drawings. The present invention is not limited only to these examples. It is to be noted that the glass transition temperature (Tg) of 20 to 80° C. herein refers to the case where the glass transition temperature is higher than 20° C. and lower than 80° C. Other numerical ranges indicated by "* to **" however include the upper limit values and the lower limit values.

Embodiment 1

Figure 1:
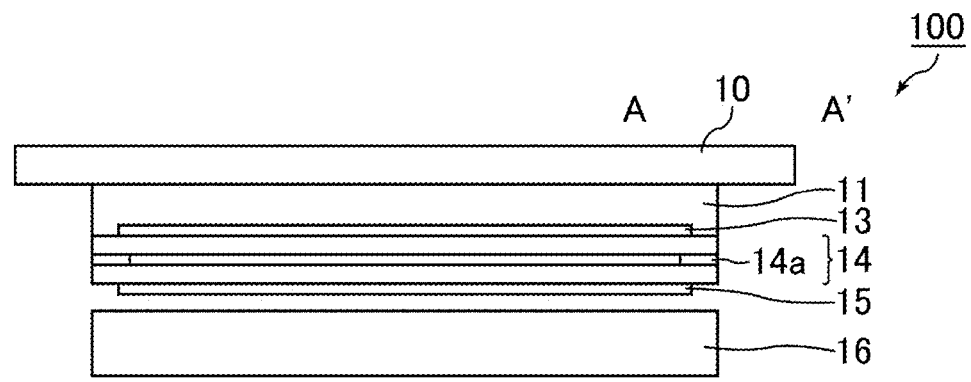
FIG. 1 is a schematic cross-sectional view illustrating a liquid crystal display panel equipped with a front plate according to Embodiment 1.

FIG. 1 is a schematic cross-sectional view illustrating a liquid crystal display panel equipped with a front plate according to Embodiment 1. FIG. 1 schematically illustrates a cross section along the A-A' line of a liquid crystal display panel in FIG. 2 described later.

FIG. 1 illustrates a display panel 100 equipped with a front panel in which a front glass 10 as a front plate is provided on an adhesive resin 11 serving as a cured resin composition layer. The adhesive resin 11 is provided on a polarizer 13 arranged on the surface of the liquid crystal display panel 14 on the side facing a display screen (viewer side). On the back side of the liquid crystal display panel 14, a polarizer 15 and a back light unit 16 are provided in the stated order. The liquid crystal display panel 14 and the back light unit 16 are jointed using, for example, a frame.

The front plate commonly has a thickness of 2.5 mm or more and 3.0 mm or less. The cured resin composition layer commonly has a thickness of 0.05 to 15 mm and more preferably 0.1 to 0.5 mm in the case where the front plate and the display surface are bonded to each other using a resin composition and the resin composition is then cured by UV light or the like. In the case where the display panel is a liquid crystal display panel, transparent substrates (glass substrates and the like) used as a pair of substrates in the liquid crystal display panel each commonly have a thickness of 0.4 to 1.0 mm. In the case of using an adhesive sheet, the thickness thereof is, for example, 0.1 to 1 mm.

Figure 2:
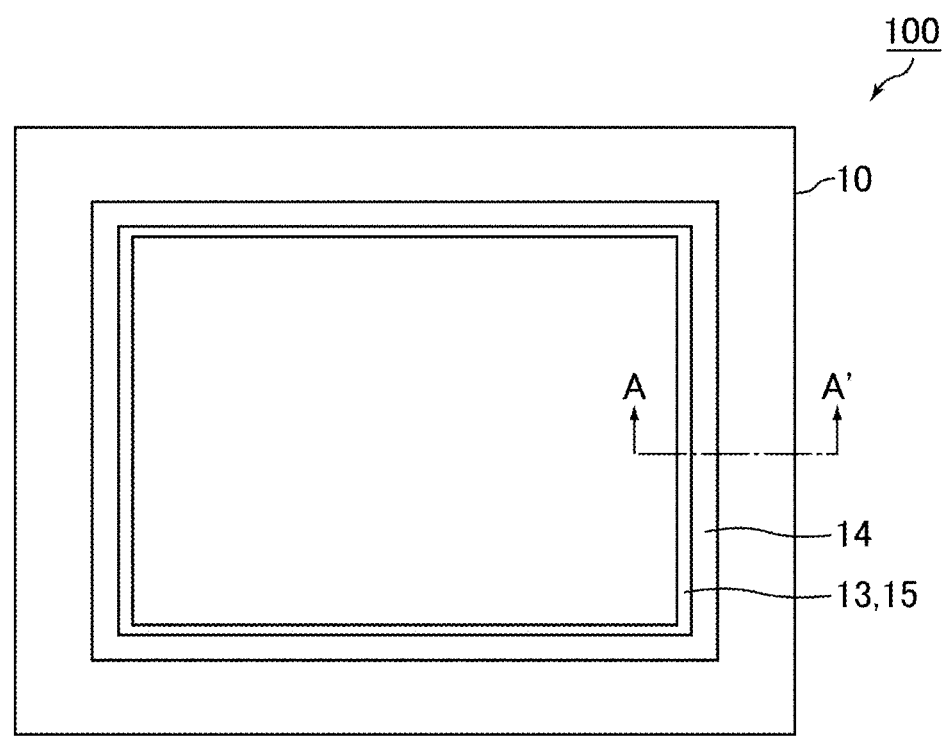
FIG. 2 is a schematic plan view illustrating the liquid crystal display panel equipped with a front plate according to Embodiment 1.

FIG. 2 is a schematic plan view illustrating the liquid crystal display panel equipped with a front plate according to Embodiment 1.

As illustrated in FIG. 2, the size of the polarizer 13 attached to the liquid crystal display panel 14 on the side facing the display surface and the polarizer 15 attached to the liquid crystal display panel 14 on the back side are commonly smaller than the size of the liquid crystal display panel 14.

In Embodiment 1, the cured resin composition layer has a loss tangent of 0.2 or more and 2 or less at 0 to 70° C.

A cured resin composition in the liquid crystal display panel in Embodiment 1 is formed by curing, for example, at 20 to 30° C. The resin composition has a fast curing component and a slow curing component. In the curing reaction, the fast curing component is cured at an early stage to set the volume so that volume shrinkage on curing of the resin composition is reduced, and the slow curing component provides a desired elastic modulus after curing. In addition, a creeping property can be lowered.

Figure 3:
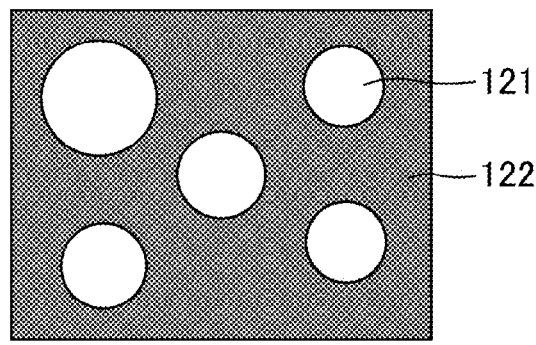
FIG. 3 is a schematic view illustrating a cured resin composition having a sea-island structure according to Embodiment 1.
Figure 4:
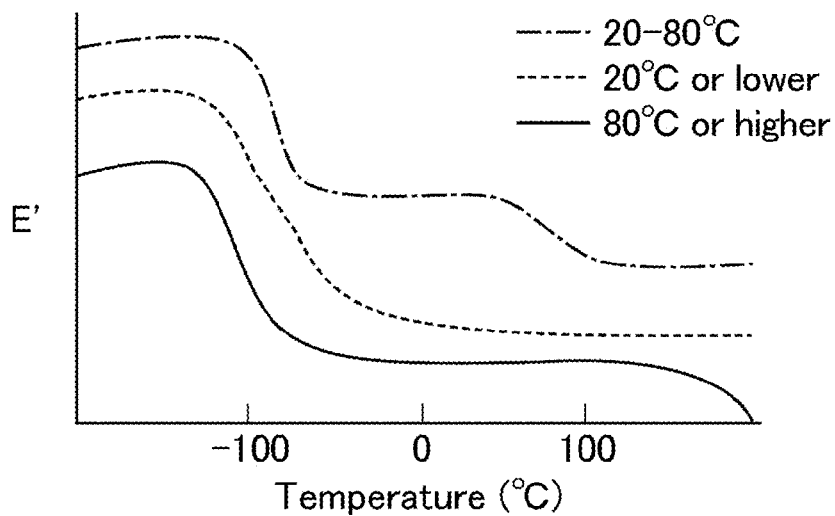
FIG. 4 is a graph showing storage elastic moduli relative to the temperature in the cured resin composition having a sea-island structure illustrated in FIG. 3.
Figure 5:
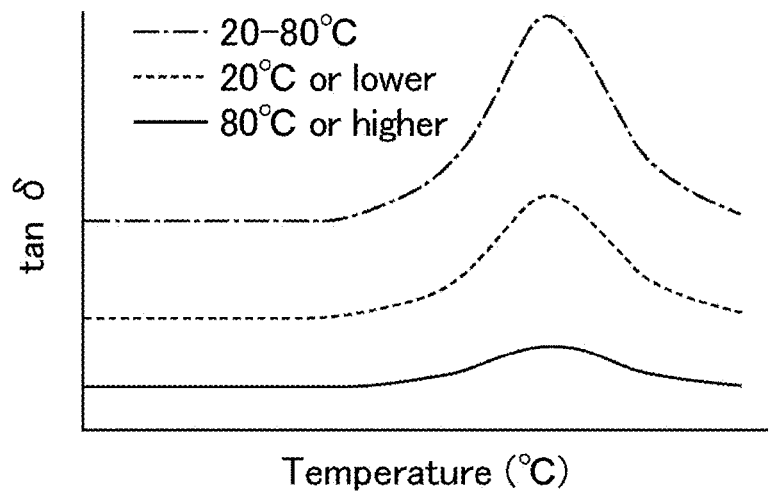
FIG. 5 is a graph showing loss tangent (tan δ) relative to the temperature in the cured resin composition having a sea-island structure illustrated in FIG. 3.

FIG. 3 is a schematic view illustrating a cured resin composition having a sea-island structure according to Embodiment 1. FIG. 4 is a graph showing storage elastic moduli relative to the temperature in the cured resin composition having a sea-island structure illustrated in FIG. 3. FIG. 5 is a graph showing loss tangent (tan δ) relative to the temperature in the cured resin composition having a sea-island structure illustrated in FIG. 3.

In Embodiment 1, the cured resin composition layer is formed from a resin composition containing a monomer component. The monomer component includes monomers not having a glass transition temperature within 20 to 80° C. Accordingly, as illustrated in FIG. 4, generation of a transition point is sufficiently prevented within 20 to 80° C. FIG. 5 shows that the value of tan δ within the operating temperature range can be sufficiently lowered. In particular, the monomer component preferably includes monomers having a glass transition temperature of 20° C. or lower and monomers having a glass transition temperature of 80° C. or higher.

The cured resin composition layer is formed from a resin composition containing a monomer component, and the monomer component includes monomers having a glass transition temperature of 20 to 80° C. and monomers having a glass transition temperature of 80° C. or higher. In addition, the amount of the monomers having a glass transition temperature of 80° C. or higher is 3% by mass or more in the resin composition (100% by mass).

Adjustment of the glass transition temperature of monomers included in the monomer component as mentioned above favorably controls the loss tangent to achieve the range of loss tangent of Embodiment 1.

Figure 6:
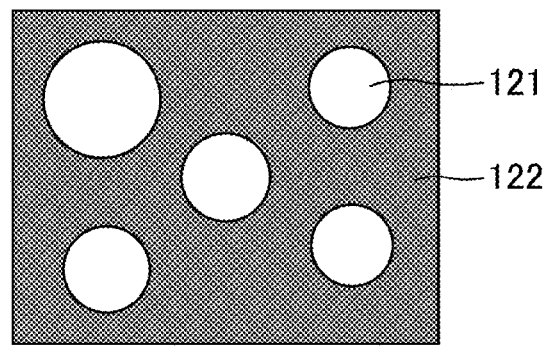
FIG. 6 is a schematic view illustrating the sea-island structure of the cured resin composition according to Embodiment 1.
Figure 7:
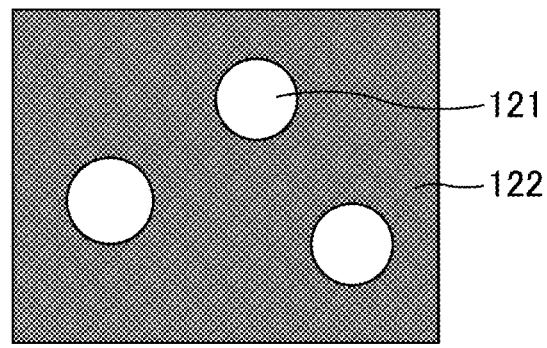
FIG. 7 is a schematic view illustrating the sea-island structure of the cured resin composition according to Embodiment 1.
Figure 8:
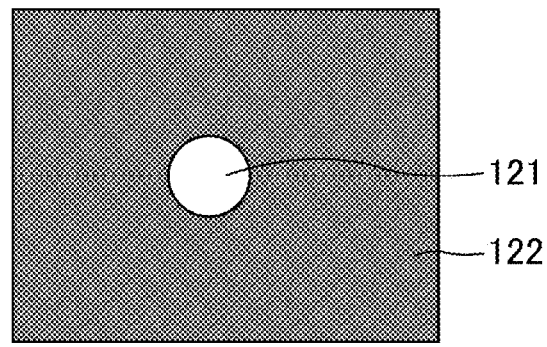
FIG. 8 is a schematic view illustrating the sea-island structure of the cured resin composition according to Embodiment 1.

FIGS. 6 to 8 are schematic views each illustrating the sea-island structure of the cured resin composition according to Embodiment 1.

FIGS. 6 to 8 schematically show that percentage of island polymers are decreased in the ascending order of the drawing numbers. The percentage of island polymer of 20% or lower can also favorably adjust the loss tangent, so that the range of loss tangent of Embodiment 1 is achieved.

Table 1 shows exemplary monomers usable in the resin composition of Embodiment 1. Monomers shown in Table 1 may be appropriately used in consideration of the glass transition temperature and a blending ratio of monomers.

TABLE 1

| | Chemical names | Tg (° C.) |
|---|---|---|
| Aliphatic series | Methyl methacrylate | 105 |
| | Ethyl methacrylate | 65 |
| | Isobutyl methacrylate | 48 |
| | t-Butyl methacrylate | 41 |
| | n-Stearyl methacrylate | 38 |
| | n-Stearyl acrylate | 30 |
| | n-Butyl methacrylate | 20 |
| | Isobutyl acrylate | −26 |
| | Isoamyl methacrylate | −45 |
| | 2-Ethylhexyl methacrylate | −10 |
| | Isooctyl acrylate | −58 |
| | n-Octyl acrylate | −65 |
| | Isononyl acrylate | −58 |
| | Isodecyl methacrylate | −41 |
| | n-Lauryl methacrylate | −65 |
| | n-Lauryl acrylate | −3 |
| | Tridecyl methacrylate | −46 |
| | Tridecyl acrylate | −55 |
| Glycol system | Ethoxy diethylene glycol acrylate | −70 |
| | Methoxy tryethylene glycol acrylate | −50 |
| | Alkoxylated lauryl acrylate | −45 |
| | Phenoxyethyl acrylate | −22 |
| | Phenoxy polyethylene glycol acrylate | −25 |
| | Alkoxylated tetrahydrofurfuryl acrylate | −51 |
| Hydroxyl groups | 4-Hydroxy buryl acrylate | −32 |
| | 2-Hydroxyl-ethyl acrylate | −15 |
| | 2-Hydroxyl-propyl acrylate | −7 |
| | 1,4-Cyclohexane dimethanol monoacrylate | 18 |
| | 2-Hydroxyl-propyl methacrylate | 26 |
| | 2-Hydroxyl-ethyl methacrylate | 55 |
| Alicycles | Tetrahydrofurfuryl acrylate | −12 |
| | Dicyclopentenyl oxyethyl acrylate | 10 |
| | Cyclohexyl acrylate | 15 |
| | Cyclotrimethylolpropane formal acrylate | 32 |
| | Dicyclopentenyl oxyethyl methacrylate | 40 |
| | Benzyl methacrylate | 54 |
| | Tetrahydrofurfuryl methacrylate | 60 |
| | Cyclohexyl methacrylate | 66 |
| | 3,3,5-Trimethylcyclohexane acrylate | 81 |
| | Isobornyl acrylate | 94 |
| | Dicyclopentanyl acrylate | 120 |
| | Dicyclopentenyl acrylate | 120 |
| | Dicyclomenthanyl methacrylate | 175 |
| | Isobornyl methacrylate | 180 |

The nonreactive component mentioned above may be used as a nonreactive component usable in the resin composition of Embodiment 1.

The phase transformation temperature and phase change temperature of the nonreactive component are higher than those of the framework component.

Examples 1 to 8, Comparative Examples 1 and 2

Tables 2 and 3 below each show constitutions of monomer components in resin compositions that form cured resin composition layers in Examples 1 to 8 and Comparative Examples 1 and 2. With regard to the items of "Oligomer", "Monomer A", "Monomer B", "Monomer C", "Monomer D", "Nonreactive component A", and "Nonreactive component B" in the tables, the sign "O" indicates use of that component in the resin composition and the sign "X" indicates nonuse of that component. The range of Tg of the used monomer is as mentioned below. In the case of Monomers A to C, the range of Tg is 20 to 80° C. In the case of Monomer D, the range of Tg is 80° C. or higher.

TABLE 2

|  | Example 1 | Example 2 | Example 3 | Example 4 | Example 5 | Example 6 | Example 7 | Example 8 |
|---|---|---|---|---|---|---|---|---|
| Reactive component (%) | 61% | 51% | 53% | 47% | 55% | 64% | 64% | 73% |
| Oligomer | ◯ | ◯ | ◯ | ◯ | ◯ | ◯ | ◯ | ◯ |
| Monomer A | ◯ | ◯ | ◯ | ◯ | ◯ | ◯ | ◯ | ◯ |
| Monomer B | ◯ | ◯ | ◯ | ◯ | ◯ | ◯ | ◯ | ◯ |
| Monomer C | X | X | X | X | X | X | ◯ | ◯ |
| Monomer D | ◯ | ◯ | ◯ | ◯ | ◯ | X | ◯ | ◯ |
| Monomer Tg (° C.) | 20-80° C. 80° C. or higher | 20-80° C. 80° C. or higher | 20-80° C. 80° C. or higher | 20° C. or lower 80° C. or higher | 20° C. or lower 80° C. or higher | 20-80° C. | 20-80° C. 80° C. or higher | 20-80° C. 80° C. or higher |
| Monomer concentration at 80° C. or higher | 5.5% | 4.5% | 3.1% | 4.1% | 5.0% | — | 0.9% | 1.1% |
| Nonreactive Component (%) | 33% | 45% | 42% | 49% | 40% | 33% | 31% | 21% |
| Nonreactive Component A | ◯ | ◯ | ◯ | ◯ | ◯ | ◯ | ◯ | ◯ |
| Nonreactive Component B | X | X | X | X | X | ◯ | X | X |
| Initiator (%) | 4% | 4% | 4% | 4% | 4% | 4% | 4% | 4% |
| Additives (%) | 1% | 1% | 1% | 1% | 1% | 1% | 1% | 1% |

TABLE 3

|  | Comparative Example 1 | Comparative Example 2 |
|---|---|---|
| Reactive component (%) | 47% | 55% |
| Oligomer | ◯ | ◯ |
| Monomer A | ◯ | ◯ |
| Monomer B | ◯ | ◯ |
| Monomer C | X | ◯ |
| Monomer D | X | X |
| Monomer Tg (° C.) | 20-80° C. | 20-80° C. |
| Monomer concentration at 80° C. or higher | — | — |
| Nonreactive Component (%) | 49% | 38% |
| Nonreactive Component A | ◯ | ◯ |
| Nonreactive Component B | ◯ | X |
| Initiator (%) | 4% | 4% |
| Additives (%) | 1% | 1% |

Figure 9:
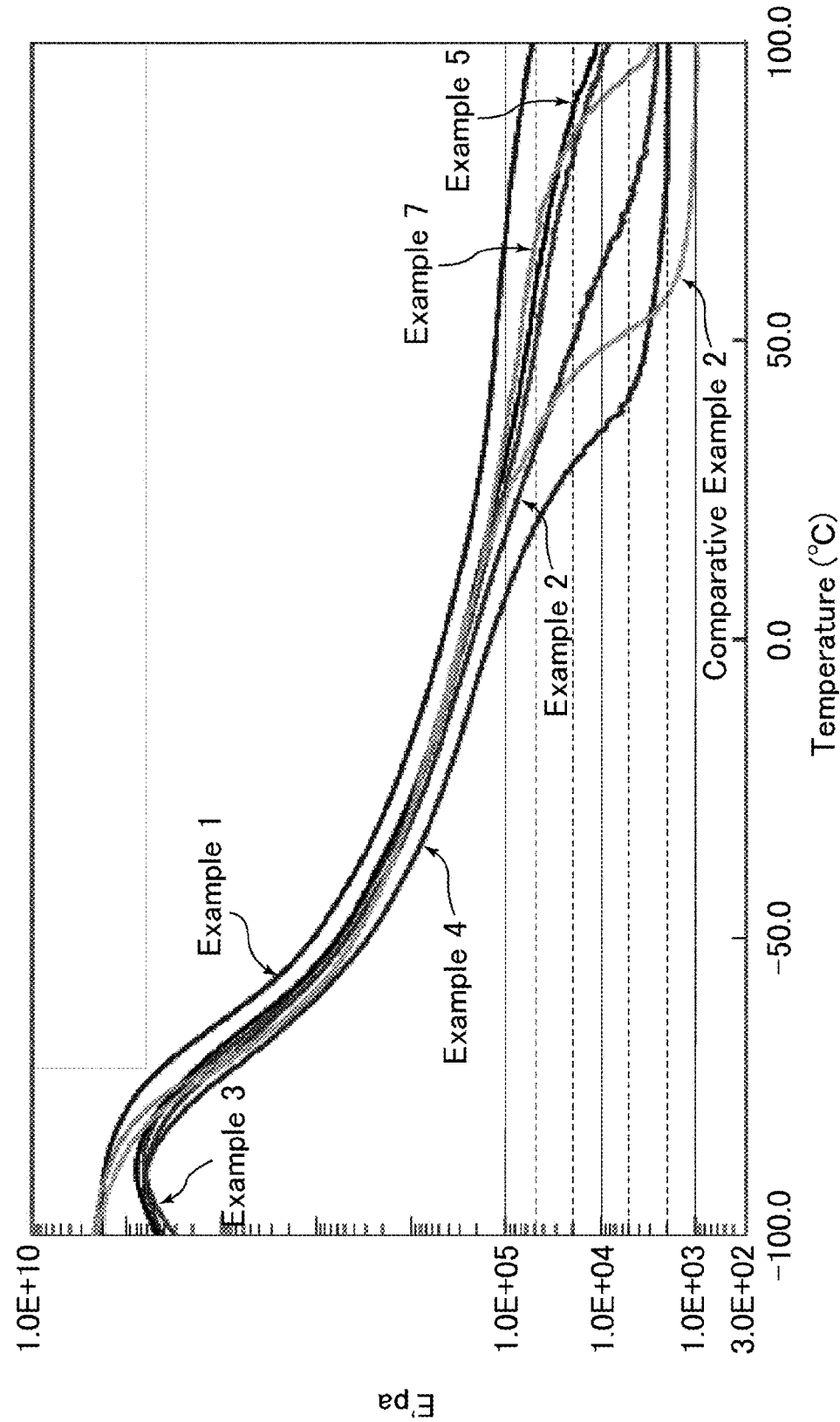
FIG. 9 is a graph showing storage elastic moduli relative to the temperature of the cured resin composition.

FIG. 9 is a graph showing storage elastic moduli relative to the temperature of the cured resin composition.

The storage elastic moduli of resin compositions in Examples 1 to 5 and 7 and Comparative Example 2 are shown. As shown in Table 4 described later, peripheral unevenness was reduced in Examples 1 to 5 to the extent that the articles have fair quality. Especially, in Examples 2 and 4, peripheral unevenness was substantially resolved.

In Examples 2 and 4, the elastic modulus was small over a wide temperature range compared to those in examples and comparative examples shown in FIG. 9. This shows a totally small elastic modulus is preferable.

In Comparative Example 2 in which the elastic modulus was extremely small at a temperature around room temperature to 60° C., peripheral unevenness occurred.

Accordingly, a radical change in the elastic modulus is not appropriate in terms of peripheral unevenness and may be a cause of another stress, even if the elastic modulus is small.

In this respect, tan δ shows a physical property change like a phase change occurs at around 60° C. in Comparative Example 2, which indicates necessity of the state where a crosslinked molecular framework is left.

Figure 10:
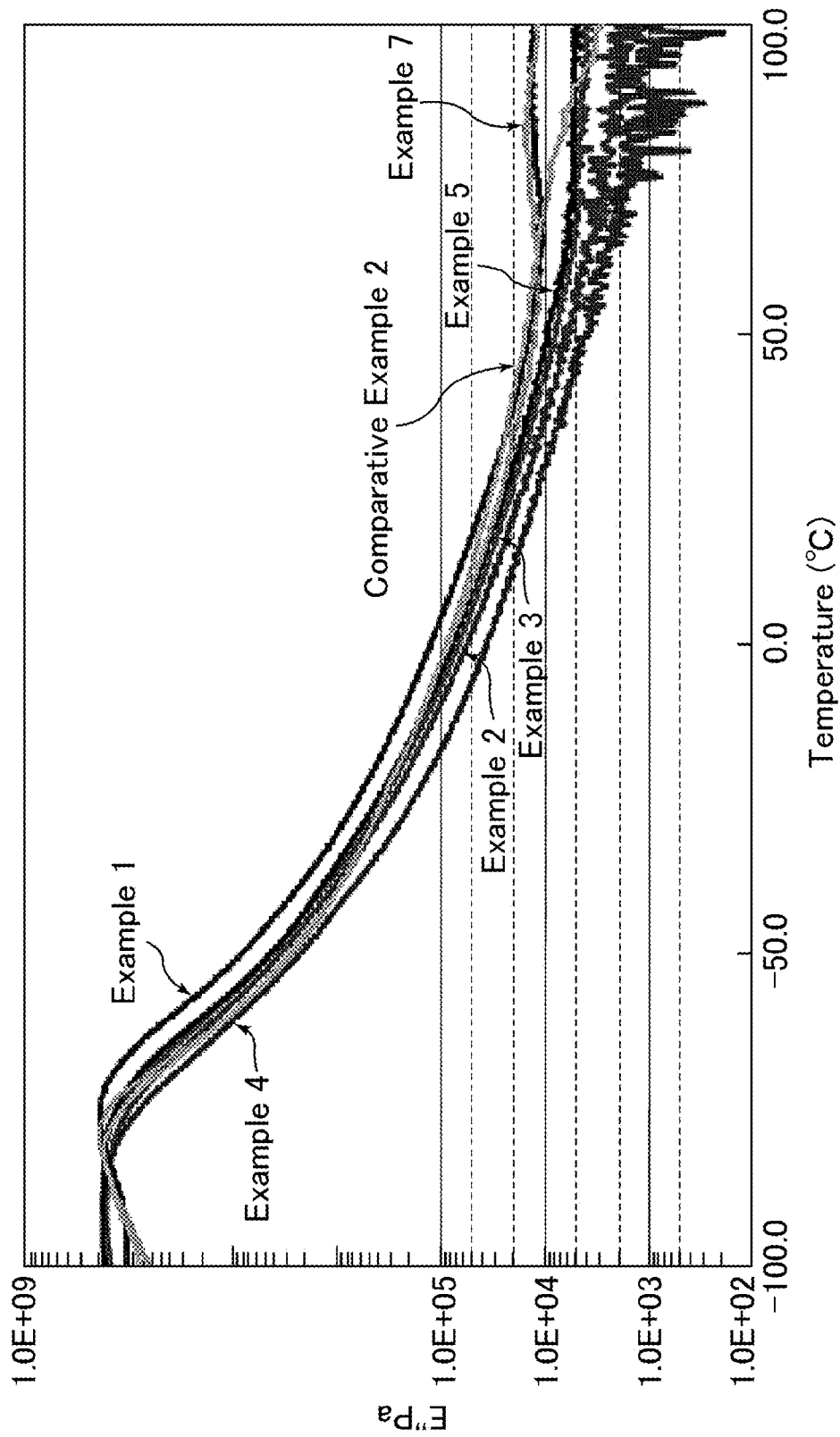
FIG. 10 is a graph showing loss elastic moduli relative to the temperature of the cured resin composition.

FIG. 10 is a graph showing loss elastic moduli relative to the temperature of the cured resin composition.

Figure 11:
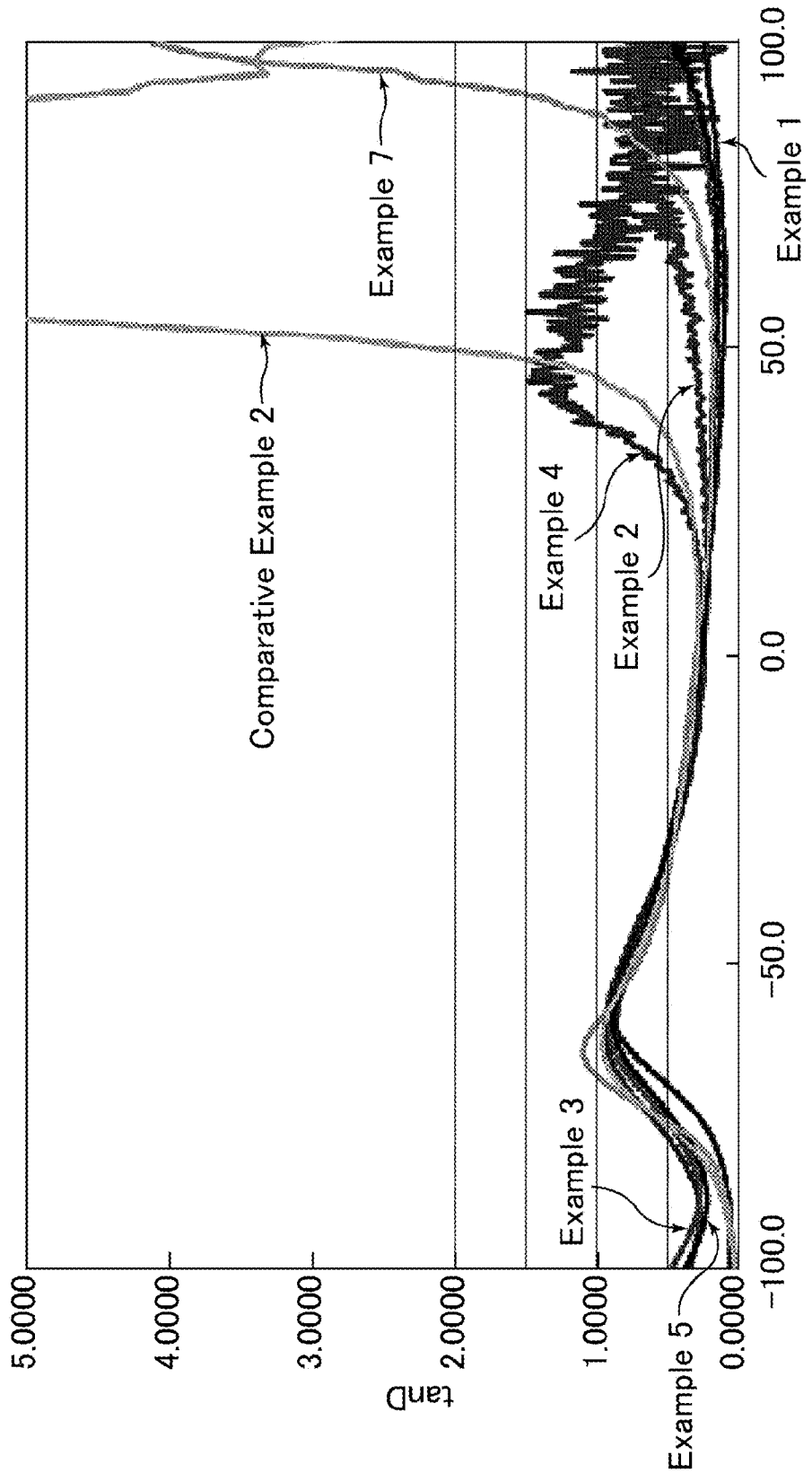
FIG. 11 is a graph showing loss tangent (tan δ) relative to the temperature of the cured resin composition.

FIG. 11 is a graph showing loss tangent (tan δ) relative to the temperature of the cured resin composition.

Figure 12:
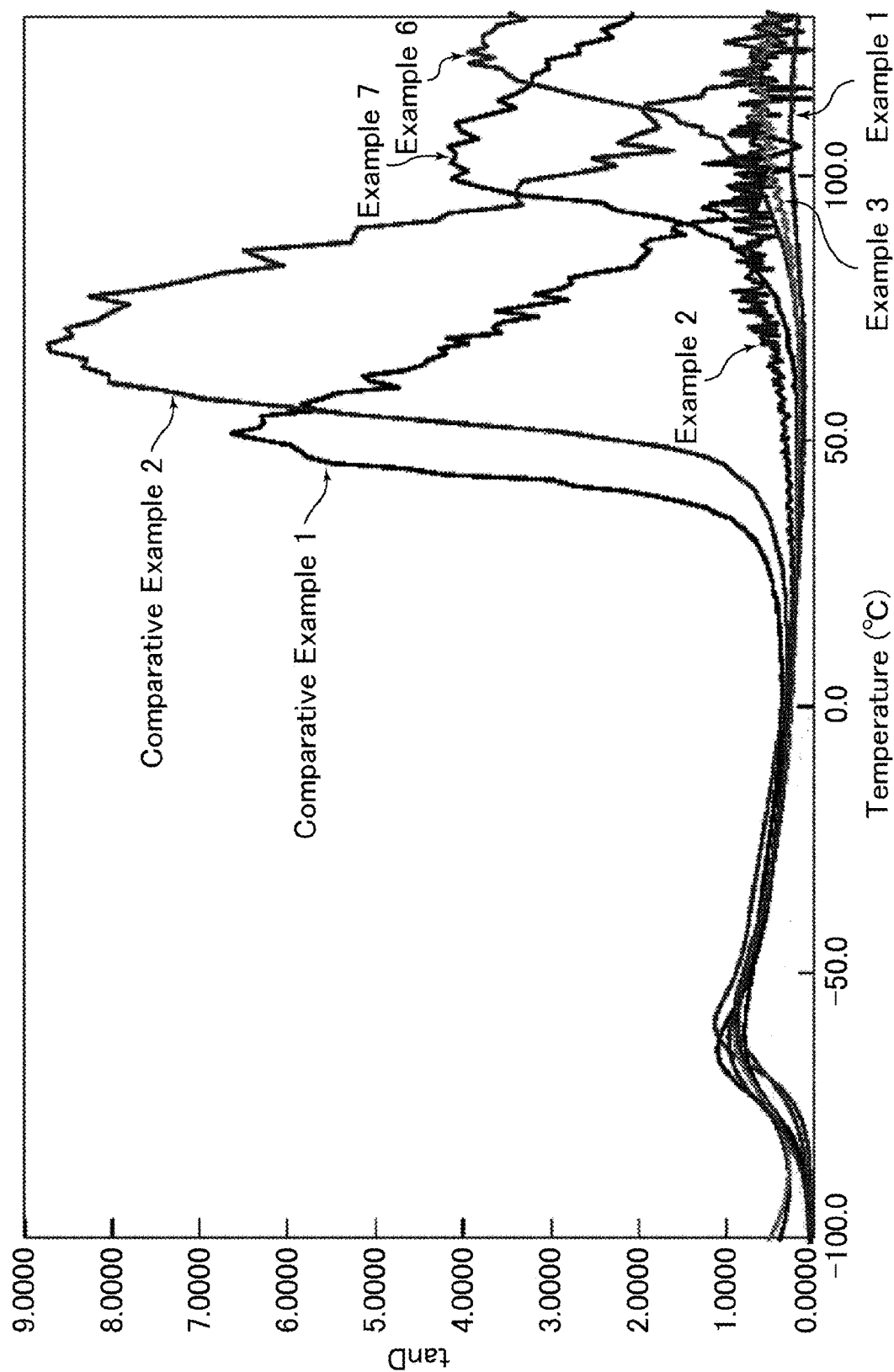
FIG. 12 is a graph showing loss tangent (tan δ) relative to the temperature of the cured resin composition.

FIG. 12 is a graph showing loss tangent (tan δ) relative to the temperature of the cured resin composition.

Figure 13:
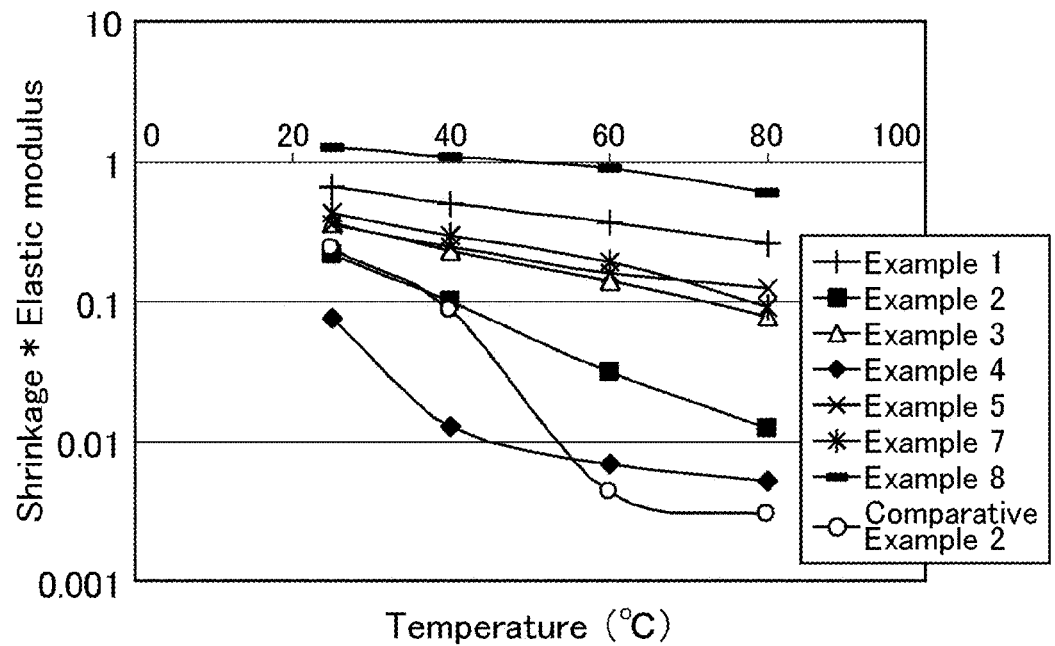
FIG. 13 is a graph showing the products of shrinkages and storage elastic moduli relative to the temperature of the cured resin composition.
Figure 14:
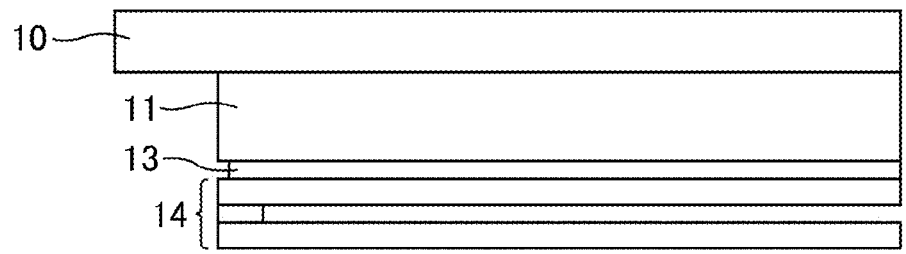
FIG. 14 is a schematic cross-sectional view illustrating a conventional liquid crystal display panel equipped with a front plate.
Figure 15:
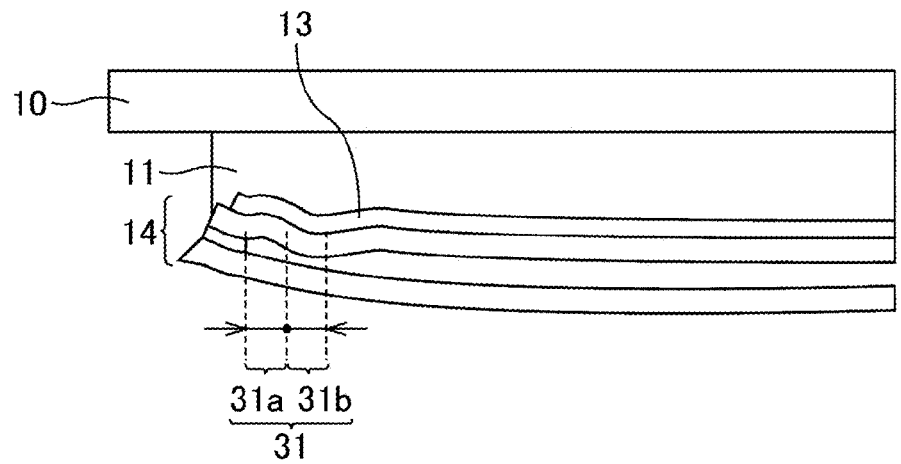
FIG. 15 is a schematic cross-sectional view illustrating a conventional liquid crystal display panel equipped with a front plate.
Figure 16:
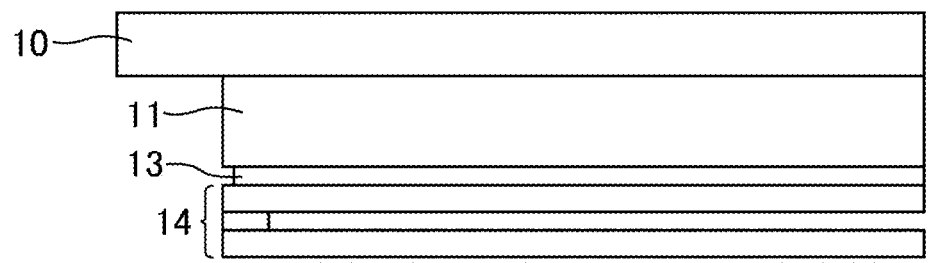
FIG. 16 is a schematic cross-sectional view illustrating a conventional liquid crystal display panel equipped with a front plate.
Figure 17:
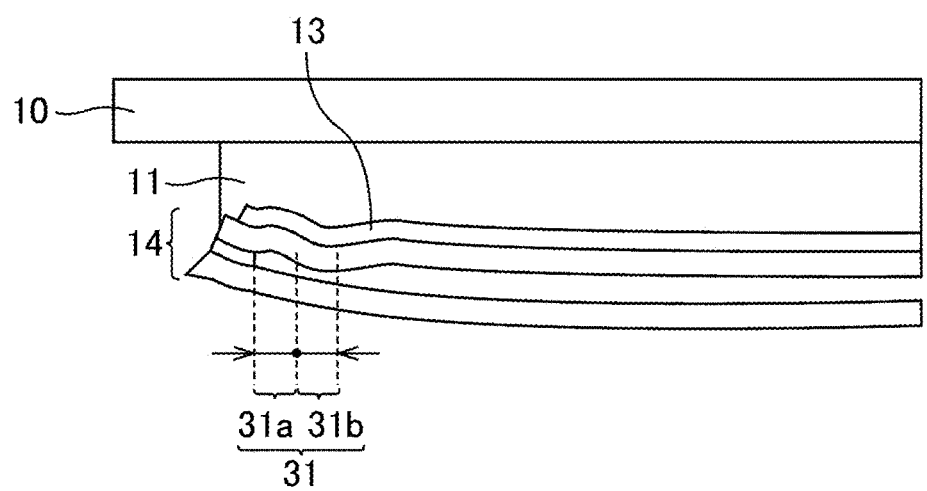
FIG. 17 is a schematic cross-sectional view illustrating a conventional liquid crystal display panel equipped with a front plate.
Figure 18:
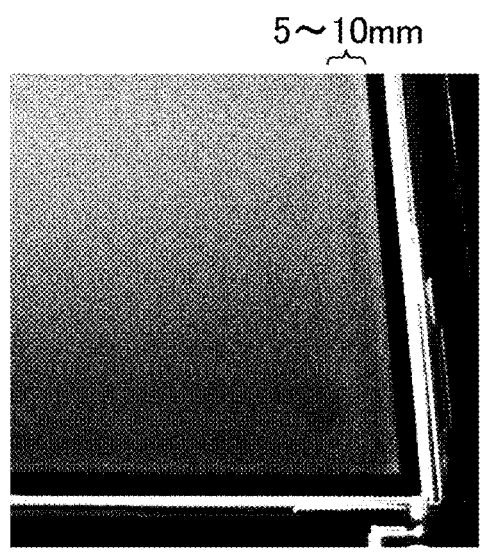
FIG. 18 is a photo showing a conventional liquid crystal display panel equipped with a front plate.
Figure 19:
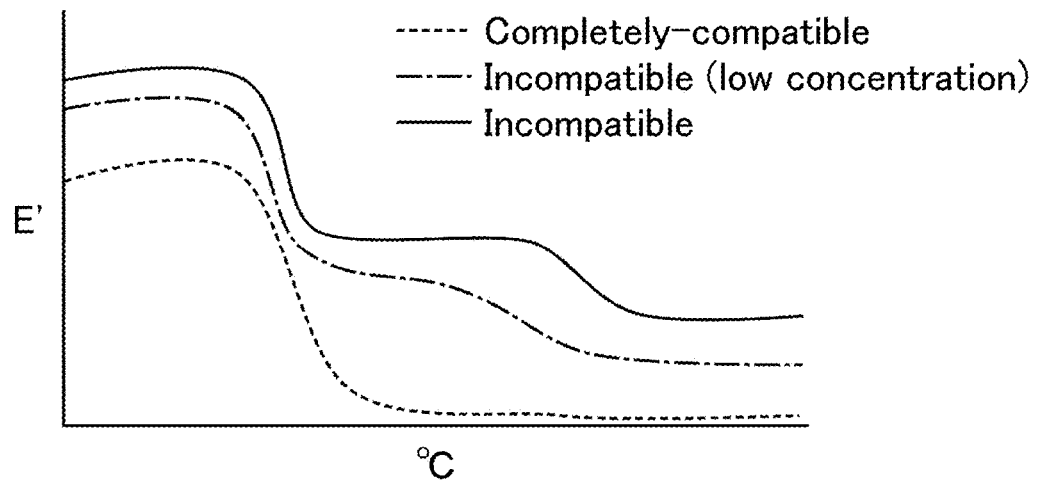
FIG. 19 is a graph showing storage elastic moduli relative to the temperature in a completely-compatible cured resin composition and an incompatible cured resin composition.
Figure 20:
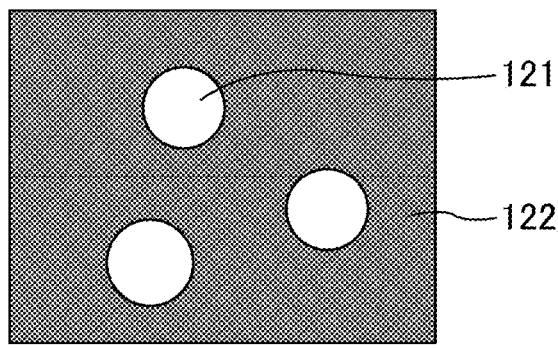
FIG. 20 is a schematic view illustrating a cured resin composition in an incompatible state (having a sea-island structure).
Figure 21:
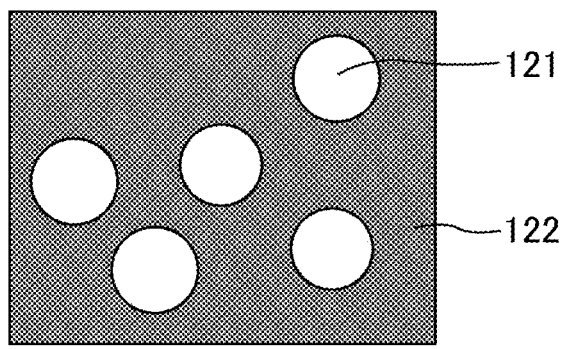
FIG. 21 is a schematic view illustrating a cured resin composition in an incompatible state (having a sea-island structure).
Figure 22:
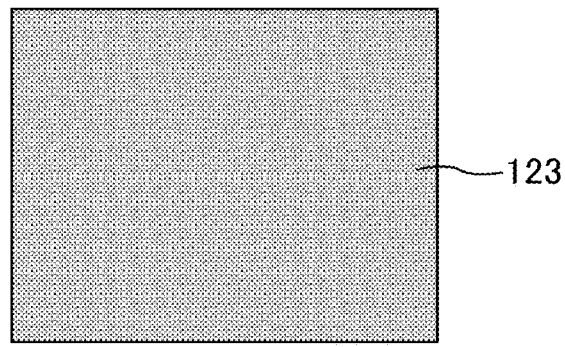
FIG. 22 is a schematic view illustrating a cured resin composition in a compatible state.

FIG. 13 is a graph showing the products of shrinkages and storage elastic moduli relative to the temperature of the cured resin composition.

Tables 4 and 5 show physical properties of the cured resin compositions in the display panel equipped with a front plate of Examples 1 to 8 and Comparative Examples 1 and 2. With regard to levels of streak unevenness, the level "OK to the naked eye" refers to a level that no peripheral unevenness is observed by the naked eye in a gray scale image (32nd tone level in 256 tones wherein white is set to the 255th tone). The level "Naked eye level" refers to a level that peripheral unevenness is observed with the naked eye but not observed through a ND 10% filter (ND filter having a transmittance of 10%, the same shall apply to ND 8%, ND 5%, and ND 3%). The level "ND 10%" refers to a level that streak unevenness is not observed through a ND 10% filter but peripheral unevenness is observed through a ND 8% filter. Similarly, the level "ND 8%" refers to a level that peripheral unevenness is not observed through a ND 8% filter but observed through a ND 5% filter. The level "ND 5%" refers to a level that peripheral unevenness is not observed through a ND 5% filter but observed through a ND 3%. The level "ND 3%" refers to a level that peripheral unevenness is observed through a ND 3% filter. The degree of peripheral unevenness is mentioned in order from smallest (best) to largest (worst): "OK to the naked eye"<"Naked eye level"<ND 100<ND 8%<ND 5%<ND 3%.

Each item in the tables is described below. Curing was performed by irradiation with UV light having a wavelength of 350 nm using a metal halide lamp (EYE GRAPHICS CO., LTD.) and an illumination meter (ORC MANUFACTURING CO., LTD.). The type-A hardness was measured at 25° C. in conformity with "JIS HANDBOOK Rubber-1 2007, K-6253 Determination of hardness of rubber". The shrinkage refers to volume shrinkage. The storage elastic modulus was measured by pulling a test sample in a size of 50×10×4 mm using a dynamic viscoelasticity analyzer (Seiko Instruments Inc., DMS-6100) at a measured temperature of −100 to 100° C. (rate of temperature rise of 2° C./min) and a frequency of 1 Hz in a tension mode. The G/G adhesive strength was measured as follows. A test sample was set, such that an adhesive area is φ 5 mm and an adhesive thickness is 0.3 mm, to bond glass plates in a cross shape and then UV-cured. The lower glass was fixed and the upper glass was pulled at a rate of the tension test of 5 mm/min. The value of the maximum load when the test sample was peeled was the adhesive strength. The transmittance and YI (yellowness) were measured as follows. A test sample was set to have a thickness of 0.3 mm between two glass plates and then UV-cured. The light transmittance of a cured product in a range of 400 to 800 nm was measured using a UV/visible spectrophotometer (JASCO V-570, JASCO Corporation). The YI was calculated from the measured values.

TABLE 4

|  |  | Example 1 | Example 2 | Example 3 | Example 4 | Example 5 | Example 6 | Example 7 | Example 8 |
|---|---|---|---|---|---|---|---|---|---|
| Type A hardness | | 8 | 4 | 6 | 2 | 6 | 9 | 8 | 19 |
| Shrinkage (%) | | 3.3 | 3.1 | 3.7 | 2.6 | 4.5 | 3.3 | 3.3 | 3.7 |
| Tan δ | Peak value | 0.26 | 0.95 | 0.75 | 1.4 | 0.87 | 3.92 | 4.08 | 0.23 |
| | Peak temperature | 108 | 98 | 120 | 45.5 | 118.3 | 121 | 104 | 87.3 |
| Storage elastic modulus (Mpa) | 25° C. | 0.19 | 0.070 | 0.10 | 0.029 | 0.080 | 0.17 | 0.13 | 0.34 |
| | 40° C. | 0.14 | 0.031 | 0.062 | 0.0049 | 0.053 | 0.12 | 0.089 | 0.29 |
| | 60° C. | 0.11 | 0.011 | 0.037 | 0.0025 | 0.035 | 0.094 | 0.058 | 0.24 |
| | 80° C. | 0.082 | 0.0038 | 0.020 | 0.0020 | 0.028 | 0.062 | 0.027 | 0.15 |
| Eelastic modulus * Shrinkage | 25° C. | 0.66 | 0.217 | 0.37 | 0.0754 | 0.36 | 0.561 | 0.429 | 1.2765 |
| | 40° C. | 0.495 | 0.0992 | 0.2294 | 0.01274 | 0.243 | 0.396 | 0.2937 | 1.073 |
| | 60° C. | 0.363 | 0.031 | 0.1406 | 0.00676 | 0.1575 | 0.3102 | 0.1914 | 0.888 |
| | 80° C. | 0.264 | 0.0124 | 0.0777 | 0.0052 | 0.126 | 0.2046 | 0.0924 | 0.592 |
| G/G strength (N/mm) | | 5.1 | 3.0 | 3.7 | 2.4 | 4.0 | 5.2 | 5.0 | 5.5 |
| Transmittance (400-800 nm) | | 97% or more | 97% or more | 97% or more | 97% or more | 97% or more | 97% or more | 97% or more | 97% or more |
| YI | | 0.74 | 0.71 | 0.69 | 0.67 | 0.71 | — | 0.58 | 0.69 |
| Bubbles | | None | None | None | None | None | None | None | Present |
| Initial unevenness | | OK to the naked eye | OK to the naked eye | OK to the naked eye | OK to the naked eye | OK to the naked eye | OK to the naked eye | OK to the naked eye | Naked eye level |
| Unevenness at 60° C. | | Naked eye level | OK to the naked eye | OK to the naked eye | OK to the naked eye | OK to the naked eye | ND 8% | ND 8% | ND 8% |

TABLE 5

|  |  | Comparative Example 1 | Comparative Example 2 |
|---|---|---|---|
| Type A hardness | | 0 | 5 |
| Shrinkage (%) | | 2.3 | 2.7 |
| Tan δ | Peak value | 6.64 | 8.70 |
| | Peak temperature | 51.3 | 66 |
| Storage elastic modulus (Mpa) | 25° C. | 0.062 | 0.088 |
| | 40° C. | 0.0069 | 0.031 |
| | 60° C. | 0.0011 | 0.0015 |
| | 80° C. | 0.0010 | 0.001 |
| Eelastic modulus *Shrinkage | 25° C. | 0.1426 | 0.2403 |
| | 40° C. | 0.01587 | 0.0864 |
| | 60° C. | 0.00253 | 0.00432 |
| | 80° C. | 0.00230 | 0.00297 |
| G/G strength (N/mm) | | 1.9 | 3.8 |
| Transmittance (400-800 nm) | | 97% or more | 97% or more |
| YI | | 0.4 | 0.43 |
| Bubbles | | Present | None |
| Initial unevenness | | OK to the naked eye | ND 8% |
| Unevenness at 60° C. | | ND 3% | ND 5% |

The peripheral streak unevenness (peripheral unevenness) of the samples shown in the tables was evaluated. In Examples 1 to 7, initial unevenness (peripheral unevenness observed after bonding and UV curing) was not observed. In Examples 2 to 5, not only initial unevenness but also peripheral unevenness even after standing at 60° C. In Examples 1 to 5, the peripheral unevenness and the amount of bubbles are almost at the same levels.

In curing from a liquid state, since a curing reaction proceeds at around room temperature, the temperature hardly contributes to the reaction and the shrinkage presumably causes generation of stress. Assuming that samples at the "Naked eye level" or better are conforming articles, it is preferable to set the shrinkage to 4.5% or less, though it depends on a relation with the elastic modulus.

The elastic modulus presumably highly contributes to a movement after curing.

Here, the product of the elastic modulus and shrinkage is plotted as an indication of deformation. Then, in Examples 2 to 5, peripheral unevenness was not observed after standing at 60° C. The shrinkage*elastic modulus is preferably 0.16 or less at 60° C. and 0.37 or less at 25° C.

In Comparative Example 2, however, peripheral unevenness occurred, though the shrinkage*elastic modulus was within the above range. This indicates that simple reduction in storage elastic modulus is not enough.

Graphs (FIGS. 11 and 12) of tan δ show that a great peak is present at a temperature just over 50° C. in Comparative Example 2 to show a divergence tendency. In the graph (FIG. 13) showing the product of the shrinkage and elastic modulus, the plotted line greatly falls from 40° C. to 60° C. in Comparative Example 2.

This indicates that the resin has a transformation corresponding to the phase transition. In brief, the state of the resin is presumably close to a liquid state. Accordingly, at a temperature of 60° C. or higher, the stress condition is likely to be relaxed with flow of the resin. However, if the temperature falls from the temperature of 60° C. or higher at which the stress is relaxed, the elasticity is rapidly recovered when the equilibrium point is shifted to cause generation of another stress. The equilibrium point is shifted due to difference in expansion coefficient and the like. In such a case, the resin hardly flows and easily contains the stress therein. Then, at room temperature, the resin presumable contains the stress therein.

FIG. 11 shows that, in Examples 2 and 4, tan δ is having a maximum value that is larger and more moderate than those of other examples and comparative examples. In such a state, there is not a great change like a phase transition. It is presumed that, for example, the resin is moderately transformed into a rubbery state, and thereby the resin has a better capability of following the stress but is not in a flowable state. Internal stress therefore is likely to be relaxed. In addition, molecular crosslinks are kept, so that large stress is not generated along with the temperature fall.

As a result, tan δ is preferably 0≤tan δ≤2 (preferably 0<tan δ<2) within an operating temperature range (0 to 70° C.), which is effective against peripheral unevenness. In a preferable embodiment, tan δ is 0.2≤tan δ≤2.0 (more preferably 0.2<tan δ<2.0) at 10 to 60° C. Satisfaction of the above numerical range in the operating temperature range (0 to 70° C.) is also a preferable embodiment.

In examples, the loss tangent of 2 or less within the operating temperature range (0 to 70° C.) can prevent rapid physical property change such as phase transformation in the temperature range. As a result, streak unevenness in the display area is sufficiently avoided. The loss tangent of 0.2 or more allows the cured resin composition to be elastic and soft, so that streak unevenness is prevented. Concepts for improvement are production of low elastic modulus articles in Example 1, production of low shrinkage/low elastic modulus articles in Examples 2 and 4, and production of low shrinkage articles in Example 3.

The present embodiment may be a display device including the display panel equipped with a front plate according to Embodiment 1. As a display device, exemplified are an embodiment where a front plate is a touch panel and an embodiment where a front plate is a protective plate. In Embodiment 1, the description was given on a case of a liquid crystal display panel. The present invention may be, however, applicable to various display panels such as an EL display panel. The display device preferably has a mechanism to hold a panel on the side facing a chassis (opposite to the side facing the display surface side).

The aforementioned modes may be employed in appropriate combination as long as the combination is not beyond the spirit of the present invention. The ranges determined by the phrases "* or more (higher)" and "** or less (lower)" include the indicated numerical values (* and **). Namely, the phrase "or more (higher)" means "not smaller than (the indicated numerical value and the values higher than the indicated numerical value".

The present application claims priority to Patent Application No. 2010-140409 filed in Japan on Jun. 21, 2010 under the Paris Convention and provisions of national law in a designated State, the entire contents of which are hereby incorporated by reference.

The invention claimed is:

1. A display panel equipped with a front plate comprising:
a display panel;
a front plate;
a polarizer arranged on a surface of the display panel on a display screen side of the display panel; and
a cured resin composition layer disposed between the polarizer and the front plate,
wherein the cured resin composition layer has a loss tangent of 2 or less at 0 to 70° C.,
the cured resin composition layer is formed from a resin composition containing a monomer component,
the monomer component includes a monomer having a glass transition temperature of 20 to 80° C. and a monomer having a glass transition temperature of 80° C. or higher, and
the amount of the monomer having a glass transition temperature of 80° C. or higher is 3% by mass or more based on 100% by mass of the resin composition.

2. The display panel equipped with a front plate according to claim 1,
wherein the cured resin composition layer is formed from a resin composition containing a monomer component,
the monomer component includes a monomer not having a glass transition temperature within 20 to 80° C.

3. The display panel equipped with a front plate according to claim 2,
wherein the monomer component includes at least one of a monomer having a glass transition temperature of 20° C. or lower and a monomer having a glass transition temperature of 80° C. or higher.

4. The display panel equipped with a front plate according to claim 1, wherein a resin composition of the cured resin composition layer has a volume shrinkage of 4.5% or less on curing.

5. The display panel equipped with a front plate according to claim 1, wherein a volume shrinkage (%) of a resin composition of the cured resin composition layer on curing is multiplied by a storage elastic modulus (MPa) of the cured resin composition layer to give a product of 0.16 or less at 60° C.

6. A display device comprising
the display panel equipped with a front plate according to claim 1.

7. A resin composition used for forming a cured resin composition layer in the display panel equipped with a front plate according to claim 1.

* * * * *